(12) United States Patent
Ekkizogloy et al.

(10) Patent No.: US 10,448,150 B2
(45) Date of Patent: Oct. 15, 2019

(54) METHOD AND APPARATUS TO DETECT AND ISOLATE AUDIO IN A VEHICLE USING MULTIPLE MICROPHONES

(71) Applicant: Faraday&Future Inc., Gardena, CA (US)

(72) Inventors: Luke Michael Ekkizogloy, Mountain View, CA (US); Sethu Hareesh Kolluru, Fremont, CA (US); Yunwei Liu, Alameda, CA (US); Michael Lambertus Hubertus Brouwer, Los Gatos, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/613,076

(22) Filed: Jun. 2, 2017

(65) Prior Publication Data

US 2018/0332389 A1  Nov. 15, 2018

Related U.S. Application Data

(60) Provisional application No. 62/345,716, filed on Jun. 3, 2016.

(51) Int. Cl.

| G10L 21/00 | (2013.01) |
| H04R 1/40 | (2006.01) |
| H04R 3/00 | (2006.01) |
| G10L 15/22 | (2006.01) |
| G10L 15/26 | (2006.01) |

(Continued)

(52) U.S. Cl.
CPC ............... *H04R 1/406* (2013.01); *G10L 15/22* (2013.01); *G10L 15/26* (2013.01); *H04R 3/005* (2013.01); *G01S 3/80* (2013.01); *G10L 21/028* (2013.01); *G10L 2021/02166* (2013.01); *H04R 2499/13* (2013.01)

(58) Field of Classification Search
None
See application file for complete search history.

(56) References Cited

U.S. PATENT DOCUMENTS

| 2009/0055180 A1* | 2/2009 | Coon ................. B60R 16/0373 704/251 |
| 2013/0030801 A1* | 1/2013 | Fallat ..................... G10L 21/02 704/226 |

(Continued)

*Primary Examiner* — Huyen X Vo
(74) *Attorney, Agent, or Firm* — Veros Legal Solutions, LLP (57) ABSTRACT

Certain embodiments may include methods and systems for receiving first audio data from a plurality of microphones disposed in a cabin of a vehicle, calculating phase differences between the first audio data received from different ones of the plurality of microphones, determining a location of a source of the first audio data based on the calculated phase differences, isolating second audio data received from the plurality of microphones, taking into account the determined location of the source, and controlling a function of the vehicle based on the isolated second audio data. Some embodiments can further include detecting voice data in the second audio data based on audio characteristics of the second audio data, and determining a voice command in the voice data, where the controlling the function of the vehicle is based on the voice command in the voice data in the second audio data.

14 Claims, 7 Drawing Sheets

(51) Int. Cl.
 *G10L 21/028* (2013.01)
 *G01S 3/80* (2006.01)
 *G10L 21/0216* (2013.01)

(56) References Cited

U.S. PATENT DOCUMENTS

| | | | |
|---|---|---|---|
| 2014/0200886 A1* | 7/2014 | Matsumoto | G10L 21/0208 704/226 |
| 2015/0110287 A1* | 4/2015 | Holdren | B60R 11/0247 381/86 |
| 2017/0308352 A1* | 10/2017 | Kessler | G06F 3/165 |

* cited by examiner

METHOD AND APPARATUS TO DETECT AND ISOLATE AUDIO IN A VEHICLE USING MULTIPLE MICROPHONES

CROSS-REFERENCE TO RELATED APPLICATIONS

This application claims the benefit of U.S. Provisional Application No. 62/345,716, filed Jun. 3, 2016, the entirety of which is hereby incorporated by reference.

BACKGROUND

As network-connected vehicles become more commonplace, their function has moved far beyond merely a machine to ferry people from one place to the next. Instead, vehicles have become an extension of the passengers' digital lives. Many contemporary vehicles include seamless integration of media from cell phones, the Internet, and social media along with telephony, chat, SMS, and other features, allowing people to stay connected while commuting, shopping and/or traveling. In some vehicles, many of the communication and media-based features and accessories may be voice-activated and controlled. These convenient features allow the driver to perform hands-free functions such as tuning a radio, selecting media (e.g., music or video), providing instructions to a navigational system, or the like, without taking the driver's attention off of the road.

In a multi-passenger scenario there may be numerous situations where there are multiple sources of audio. For instance, there may be two or more people taking phone calls simultaneously, a children's movie playing in the backseat, music playing in the front, an open window, ambient noise, etc., which can adversely affect the ability to intelligibly interpret voice commands in conventional hands-free systems. Better systems are needed to address such problems.

BRIEF SUMMARY

In certain embodiments, a computer-implemented method can include receiving, by a processor, first audio data from a plurality of microphones disposed in a cabin of a vehicle; calculating, by the processor, phase differences between the first audio data received from different ones of the plurality of microphones; determining, by the processor, a location of a source of the first audio data based on the calculated phase differences; isolating, by the processor, second audio data received from the plurality of microphones, taking into account the determined location of the source; and controlling a function of the vehicle based on the isolated second audio data.

In some embodiments, the method can further include detecting, by the processor, voice data in the second audio data based on audio characteristics of the second audio data, and determining, by the processor, a voice command in the voice data, where the controlling the function of the vehicle is based on the voice command in the voice data in the second audio data.

In certain embodiments, the method may further include generating a user profile associated with the voice data; determining that the location of the source of the first audio data is located in a driver's seat; detecting changes to driver-controlled performance characteristics of the vehicle; associating the detected changes with the user profile; detecting subsequent audio data having audio characteristics corresponding to the voice data; determining that a location of a source of the subsequent audio data is located in the driver's seat; and applying the detected changes to the driver-controlled performance characteristics of the vehicle.

In further embodiments, the method can include determining, by the processor, a location of a second source of third audio data received from the different ones of the plurality of microphones; isolating, by the processor, fourth audio data received from the plurality of microphones, taking into account the determined location of the second source; and controlling a second function of the vehicle based on the isolated fourth audio data. In some implementations, the vehicle can include a plurality of passenger seats, with the method further including determining, by the processor, which of the plurality of passenger seats corresponds to the determined location of the source of the first audio data, and associating a priority to the second audio data based on the determined corresponding passenger seat.

In some embodiments, when the determined corresponding passenger seat is a driver's seat, the associated priority of the second audio data can be assigned a highest priority, and when the determined corresponding passenger seat is not the driver's seat the associated priority of the second audio data can be assigned a lower priority. In some implementations, isolating the second audio data may include adjusting a directional focus of the plurality of microphones toward the determined location of the source of the first audio data.

In some embodiments, a system may include one or more processors; and one or more non-transitory computer-readable storage mediums containing instructions configured to cause the one or more processors to perform operations including receiving, by a processor, first audio data from a plurality of microphones disposed in a cabin of a vehicle; calculating, by the processor, phase differences between the first audio data received from different ones of the plurality of microphones; determining, by the processor, a location of a source of the first audio data based on the calculated phase differences; isolating, by the processor, second audio data received from the plurality of microphones, taking into account the determined location of the source; and controlling a function of the vehicle based on the isolated second audio data.

In certain embodiments, the instructions may further be configured to cause the one or more processors to perform operations including: detecting, by the processor, voice data in the second audio data based on audio characteristics of the second audio data; and determining, by the processor, a voice command in the voice data, where the controlling the function of the vehicle is based on the voice command in the voice data in the second audio data. In some cases, the instructions may further be configured to cause the one or more processors to perform operations including: generating a user profile associated with the voice data; determining that the location of the source of the first audio data is located in a driver's seat; detecting changes to driver-controlled performance characteristics of the vehicle; associating the detected changes with the user profile; detecting subsequent audio data having audio characteristics corresponding to the voice data; determining that a location of a source of the subsequent audio data is located in the driver's seat; and applying the detected changes to the driver-controlled performance characteristics of the vehicle.

In some embodiments, the instructions can further be to cause the one or more processors to perform operations including: determining, by the processor, a location of a second source of third audio data received from the different ones of the plurality of microphones; isolating, by the processor, fourth audio data received from the plurality of microphones, taking into account the determined location of the second source; and controlling a second function of the vehicle based on the isolated fourth audio data. In some cases, the vehicle can include a plurality of passenger seats, and the system can further include instructions configured to cause the one or more processors to perform operations including determining, by the processor, which of the plurality of passenger seats corresponds to the determined location of the source of the first audio data, and associating a priority to the second audio data based on the determined corresponding passenger seat.

In further embodiments, when the determined corresponding passenger seat is a driver's seat, the associated priority of the second audio data can be assigned a highest priority, and when the determined corresponding passenger seat is not the driver's seat the associated priority of the second audio data can be assigned a lower priority. In some cases, isolating the second audio data can include adjusting a directional focus of the plurality of microphones toward the determined location of the source of the first audio data.

In some embodiments a system can include a means for receiving first audio data from a plurality of microphones disposed in a cabin of a vehicle; a means for calculating phase differences between the first audio data received from different ones of the plurality of microphones; a means for determining a location of a source of the first audio data based on the calculated phase differences; a means for isolating second audio data received from the plurality of microphones, taking into account the determined location of the source; and a means for controlling a function of the vehicle based on the isolated second audio data. Certain embodiments may further include a means for detecting voice data in the second audio data based on audio characteristics of the second audio data, and a means for determining a voice command in the voice data, where the controlling the function of the vehicle is based on the voice command in the voice data in the second audio data.

In certain embodiments, the system may further include a means for generating a user profile associated with the voice data; means for determining that the location of the source of the first audio data is located in a driver's seat; a means for detecting changes to driver-controlled performance characteristics of the vehicle; a means for associating the detected changes with the user profile; a means for detecting subsequent audio data having audio characteristics corresponding to the voice data; a means for determining that a location of a source of the subsequent audio data is located in the driver's seat; and a means for applying the detected changes to the driver-controlled performance characteristics of the vehicle.

In further embodiments, the system can further include a means for determining a location of a second source of third audio data received from the different ones of the plurality of microphones; a means for isolating fourth audio data received from the plurality of microphones, taking into account the determined location of the second source; and a means for controlling a second function of the vehicle based on the isolated fourth audio data.

In some embodiments, the vehicle can include a plurality of passenger seats, and the system can further include a means for determining which of the plurality of passenger seats corresponds to the determined location of the source of the first audio data; and a means for associating a priority to the second audio data based on the determined corresponding passenger seat. In some cases, when the determined corresponding passenger seat is a driver's seat, the associated priority of the second audio data can be assigned a highest priority, and when the determined corresponding passenger seat is not the driver's seat the associated priority of the second audio data can be assigned a lower priority.

BRIEF DESCRIPTION OF THE DRAWINGS

The detailed description is set forth with reference to the accompanying figures.

DETAILED DESCRIPTION

Aspects of the present disclosure relate generally to vehicular systems, and in particular to systems and methods to detect and isolate audio in a vehicle using multiple microphones.

In the following description, various embodiments of automotive systems will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a multi-passenger vehicle there may be multiple sources of audio at any one time. For example, there may be simultaneous phone conversations, media device playback, open windows and rushing wind, ambient noises, and the like. Certain embodiments of the invention can address these kinds of scenarios by simultaneously analyzing all of the audio content inside of a vehicle and parsing out each audio source for independent analysis and forwarding it to its intended destination (e.g., cell phone, media player, etc.). According to certain embodiments of the present disclosure, this is possible through multi-microphone phase analysis. By analyzing the phases of different versions of an audio signal captured at different locations (e.g., at different microphones, portions of a microphone array, etc.), the location of the source for the audio signal can be determined (e.g., trilaterated, determined via microphone array beamforming, etc.). Once the location of the audio source is determined, the audio signal may be subsequently isolated (e.g., filtered), processed (e.g., voice recognition for voice commands), and forwarded (routed) to its appropriate destination. In some cases, multiple audio signals may be routed to multiple destinations.

Figure 1:
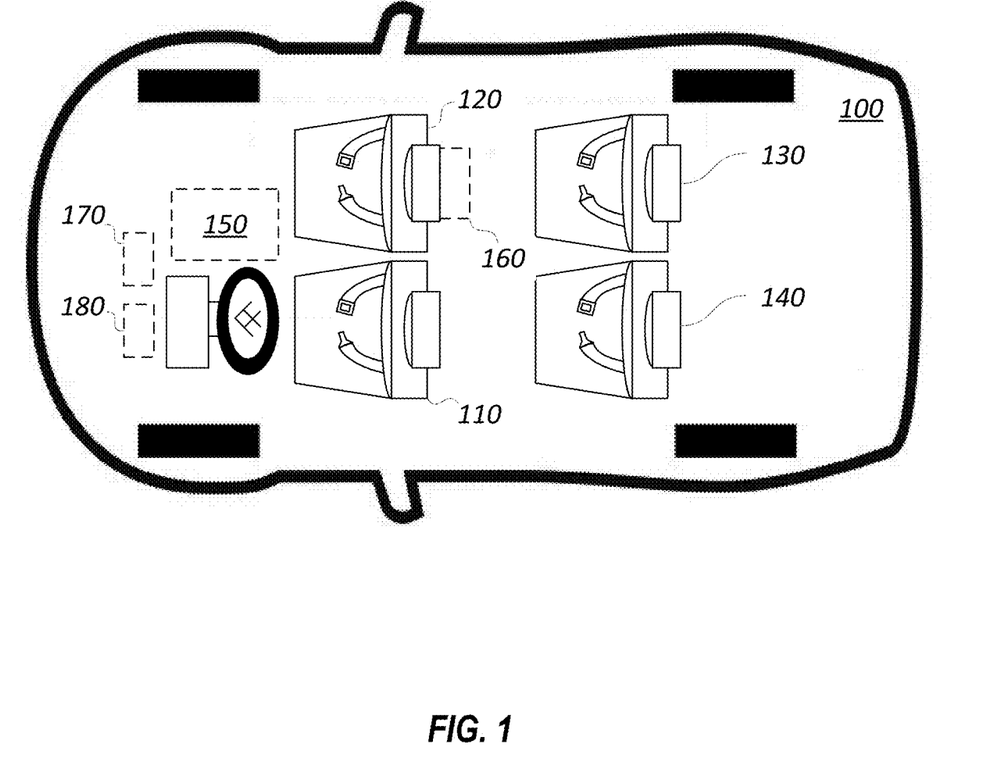
FIG. 1 shows a simplified diagram of a vehicle including a media-rich automotive infotainment system, according to certain embodiments.

FIG. 1 shows a simplified diagram of a vehicle 100 including a media-rich automotive infotainment system, according to certain embodiments. Vehicle 100 can include passenger seats 110, 120, 130, and 140, user interface 150, rear cabin display 160, navigation device (GPS) 170, and heads-up display (HUD) 180. The systems shown and discussed herein are not limiting and other systems or subsystems (e.g., additional displays, sound systems, passenger seats, etc.) may be included, as would be understood by one of ordinary skill in the art.

Vehicle 100 can be any suitable vehicle including a passenger vehicle (e.g., car, pickup, motorcycle, etc.), commercial vehicle (e.g., trucks, tractors, semi-trucks, heavy equipment), or the like, and of any type (e.g., electric vehicle, internal combustion-based vehicle, diesel vehicle, hybrid vehicle, fuel-cell-based vehicle, etc.).

Audio Source Location Detection

Figure 2:
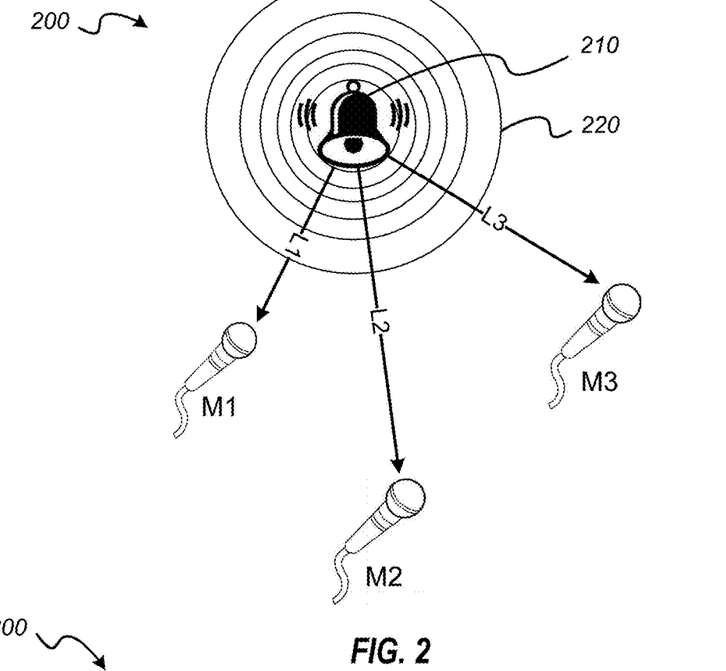
FIG. 2 shows a simplified diagram of an array of microphones placed around an audio source, according to certain embodiments.

FIG. 2 shows a simplified diagram 200 of an array of microphones M1-M3 placed around an audio source 210, according to certain embodiments. Using multiple microphones disposed at different positions from an audio source can both improve the fidelity of the recording and provide audio location capabilities using audio phase and/or timing analysis, as further discussed below. Referring to FIG. 2, audio source 210 emits an audio signal 220, which is picked up by microphones M1-M3. Microphone M1 is at a distance L1 from audio source 210, microphone M2 is at a distance L2 from audio source 210, and microphone M3 is at a distance L3 from audio source 210. Each microphone M1-M3 can be disposed at a different position relative to audio source 210. As shown in the example portrayed in FIG. 2, M1 is the closest and M2 is the farthest way from audio source 210. Each microphone M1-M3 may receive audio signal 220 (i.e., audio data) at a different time depending on their relative position with respect to audio source 210. These time differences can be calculated (i.e., as phase differences), and used to determine the location of audio source 210, such as by trilateration, as would be understood by one of ordinary skill in the art.

While FIG. 2 illustrates three microphones M1-M3 for clarity of illustration, more than three microphones may be used for audio source location, according to certain embodiments of the present disclosure. Specifically, three microphones may allow the 2-dimensional (2D) location of the audio source within a plane to be determined. However, by increasing the number microphones to four or more microphones, the 3-dimensional (3D) location of the audio source within a volumetric space such as an interior cabin of a vehicle may be determined. This may identify not only the horizontal 2D location (e.g., X and Y location) of the audio source, but also its vertical height (e.g., Z location). According to some embodiments, the addition of vertical height location may facilitate more refined and precise speaker identification and/or isolation, as passengers may be differentiated not only by where they might typically sit in the vehicle, but also by their physical height while in a sitting position. It is contemplated that many types of arrays may be implemented. For example, a 4×4 array comprising 16 microphones may be implemented in some embodiments.

Figure 3:
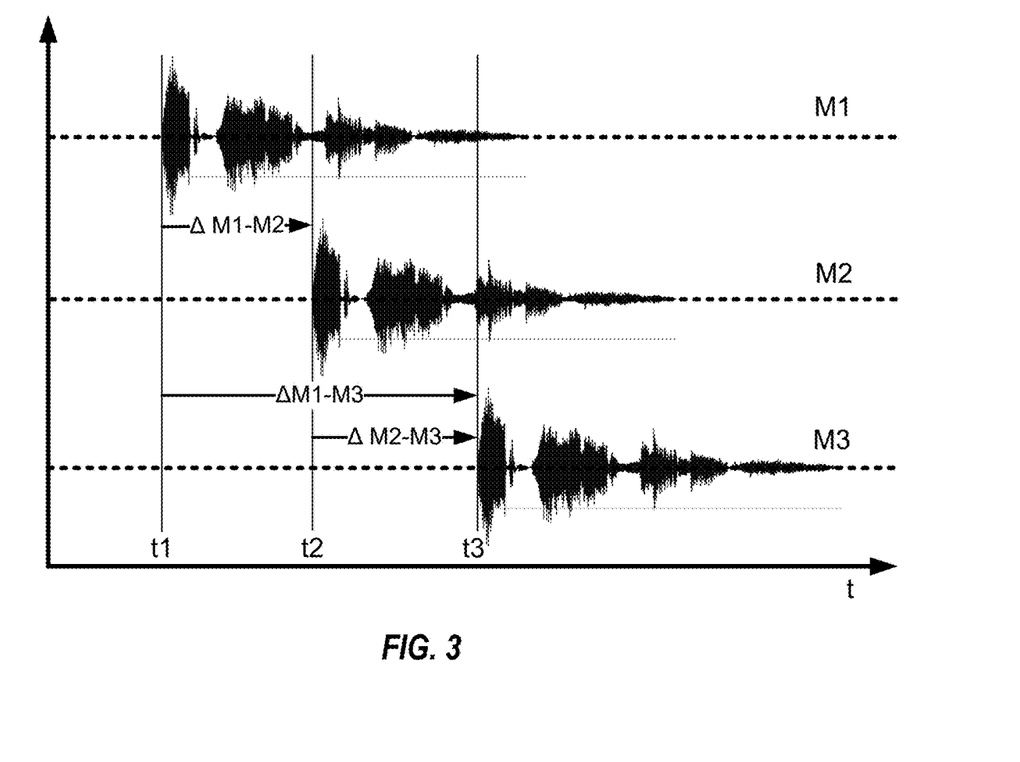
FIG. 3 shows a graph of audio recordings for a multi-microphone array, according to certain embodiments.

FIG. 3 shows a graph 300 of audio recordings for a multi-microphone array, according to certain embodiments. Returning to a simple three-microphone example, graph 300 depicts amplitude vs. time for the audio data received by each of microphones M1-M3, as shown in FIG. 2. Microphone M1 receives audio signal 220 at time t1, microphone M2 receives audio signal 220 at time t2, and microphone M3 receives audio signal 220 at time t3. As mentioned above, the time deltas between the received signals (e.g., ΔM1-M2, ΔM1-M3, ΔM2-M3) can be used to determine a location of audio source 210 using conventional trilateration techniques including time difference of arrival (TDOA), cross-correlation functions between audio signals, and geometric principles, as would be understood by one of ordinary skill in the art.

Automatic Audio Location Detection and Isolation in a Vehicle

Figure 4:
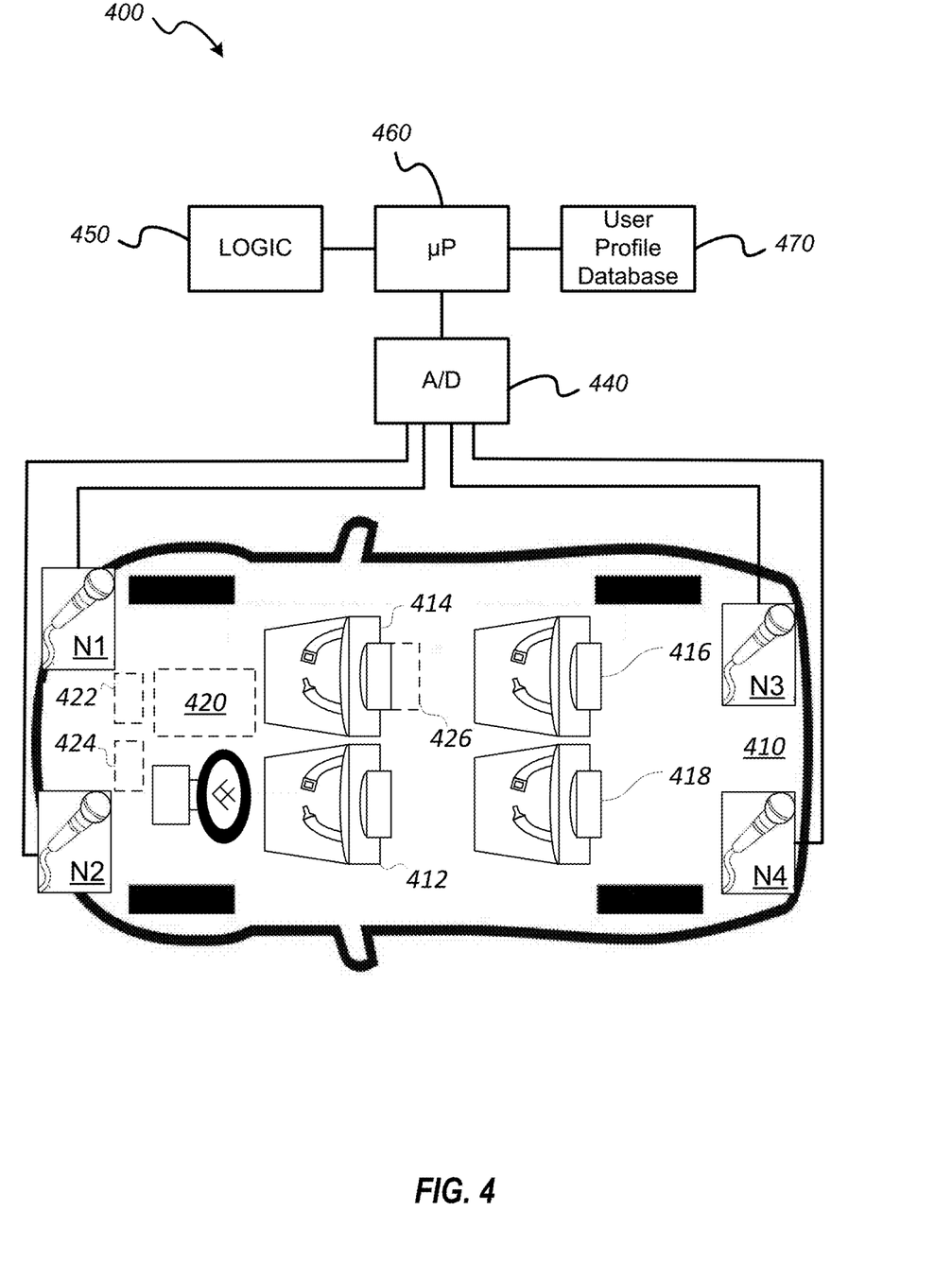
FIG. 4 shows a simplified block diagram of a system for automatic audio-source location detection and isolation in a vehicle, according to certain embodiments.

FIG. 4 shows a simplified block diagram of a system 400 for automatic audio-source location detection and isolation in a vehicle, according to certain embodiments. System 400 can include vehicle 410, two or more microphones (N1-N4), analog-to-digital converter (A/D) 440, one or more processors 460, logic 450 (i.e., software stored in memory), and user profile database 470. Vehicle 410 can include four passenger seats 412-418, user interface 420, rear cabin display 426, navigation device (GPS) 424, and heads-up display (HUD) 422. User interface 420, display 426, GPS 424, HUD 424, and any other media-based system can be referred to collectively as an infotainment system. Each system block, vehicle 410 media component (e.g., GPS 424, HUD 422), and microphone (e.g., N1-N4) can be in electrical communication with processor 460. It should be noted that while FIG. 4 includes a "top down" view showing microphones N1-N4 seemingly arranged within a flat plane, microphones N1-N4 may in fact be installed at different vertical heights in order to obtain a 3-D location of the audio source.

Vehicle 410 can include any type of vehicle (e.g., passenger vehicle, commercial vehicle, etc.). Microphones N1-N4 may be disposed in and around the cabin of vehicle 410 to detect automotive sounds (i.e., nominal and anomalous operational sounds) including, but not limited to, the various systems described above with respect to FIG. 1. Microphones N1-N4 can be any suitable type of microphone including dynamic or condenser microphones (among other types including ribbon, carbon, piezoelectric, fiber optic, laser, liquid, MEMS, or the like). Some embodiments may utilize omnidirectional microphones to detect sounds from any portion of vehicle 410. In some implementations, directional microphones can be used for certain applications (e.g., focused audio recording of specific systems). Any plurality of microphones can be used in system 400. In some embodiments, microphones N1-N4 may be servo-controlled to directionally alter their audio-focus. Some microphones may be adjustable to switch between omni-directional and directional focus. Referring to FIG. 4, microphones N1-N4 are installed in or around the cabin of vehicle 410. However, microphones can be installed in any suitable location. Automotive sounds from particular audio sources can be referred to as audio signals or audio signatures. The collective audio received (e.g., from multiple audio sources including white noise such as sound from an open window) can generally be referred to as audio data.

User interface 420 can be one or more displays configured to control aspects of the collective infotainment system. User interface 420 can include any number of features and user-controllable functions including media playback selection, mobile phone audio interface, and the like. In some embodiments, user interface 420 can be touch sensitive. Rear cabin display 426 can play media and may include user-interactive controls. GPS 422 can be a standalone unit or may be integrated with other system blocks (e.g., user interface 420). HUD 24 can display data (e.g., speed, caller information, vehicle status indicators, etc.) on the windshield or other surfaces. Each of the various displays can display images, messages, alerts, and the like, using any suitable image generation technology, e.g., a cathode ray tube (CRT), liquid crystal display (LCD), light emitting diode (LED) including organic light emitting diodes (OLED), projection system, or the like. The many alternatives, variations, and modifications of the various infotainment systems 420, 422, 424, 426, etc., would be understood by one of ordinary skill in the art.

A/D 430 can convert analog signals, if stored, into digital signals to feed into processor 440 for computational analysis. Audio signals can be stored as wave files having particular properties (e.g., amplitude, frequency, and/or time components). In some embodiments, A/D operations can be integrated into one or more other components of system 400 (e.g., processor 440). A/D usage and implementation would be understood by one of ordinary skill in the art.

In some embodiments, processor 440 can include one or more microprocessors (μCs) and may control the execution of software (e.g., logic, database management, access, and retrieval), controls, and communication between various electrical components of system 400. In some cases, processor 440 may include one or more microcontrollers (MCUs), digital signal processors (DSPs), or the like, with supporting hardware and/or firmware (e.g., memory, programmable I/Os, etc.), as would be understood by one of ordinary skill in the art.

Logic 450 can be implemented in software, firmware, hardware, or a combination thereof, to analyze and the audio data received from microphones N1-N4. In some embodiments, logic 450 can calculate the location of an audio source based on phase differences between the audio data received from each microphone, as discussed above. Logic 450 can further be used to analyze and determine audio characteristics of the audio data including amplitude, frequency, and/or phase content (e.g., timing data), isolating multiple audio sources, real-time and post-processing for filtering or improving the fidelity of the audio data, or the like. In some embodiments, logic 450 can filter or attenuate certain audio signals if they are substantially common mode signals (i.e., having no substantial phase difference between them) or originate outside of vehicle 410.

In some implementations, logic 450 can control an orientation or focus of one or more of microphones N1-N4 (e.g., via servo control) for location-targeted audio reception. Alternatively or additionally, logic 450 can control amplifier settings associated with one or more microphones N1-N4 to achieve audio signal beam forming, thereby realizing location-targeted audio reception. For example, when logic 450 determines that a certain audio source is in a specific location (e.g., right-front seat), microphones N1-N4 may be adjusted to focus audio sensing on reception of sound waves coming from the specified location and suppress reception of sound waves coming from elsewhere. Such location-targeted audio reception facilitates improved fidelity (e.g., better signal-to-noise (S/N) ratio, better signal-to-interference (S/I) ratio, etc.).

In some embodiments, logic 450 can isolate and filter audio sources once they are located and/or associated with a particular passenger seat, regardless of the number of audio sources at any one time. For example, if vehicle 410 has three audio sources including a driver giving GPS commands, a front passenger talking on the phone, and a rear passenger playing a movie on a rear cabin display 426, logic 450 can isolate the GPS commands based on the location of the audio source using phase differences between the audio signals from each microphone, and filter out the other sources using noise cancellation techniques (e.g., combine inverse audio signal with signal to be filtered out). Once the desired audio source is isolated (i.e., the GPS commands), logic 450 can route the GPS commands to its appropriate destination (i.e., GPS software). Logic 450 can receive instructions for how to route the located and isolated audio source by any suitable method including voice recognition (e.g., identifying commands in the audio data from the audio source), user interaction with user interface 420, or the like. In some implementations, this process can be performed simultaneously for multiple audio sources. For instance, each audio source can be located, filtered, and routed to its appropriate location in parallel. In some cases, the vertical location of an audio source can also be used (e.g., height of passenger's mouth) to further refine the targeting of the audio source.

In some embodiments, logic 450 can employ machine learning (artificial intelligence or "AI") to improve and refine processes over time. For example, logic 450 may identify a person by their voice data and corresponding voice characteristics (e.g., frequency, amplitude, cadence, tone, etc.). Over time, logic 450 can more quickly identify that person because it will have collected more and more data to correlate and match to the current voice data with that specific person. Additionally, other non-voice-related characteristics can be associated with the person (e.g., in a user profile as further discussed below). For instance, repeated detection of the same person may inform logic 450 of the person's height (to more quickly trilaterate the person's mouth (audio source)), the person's seating preference (e.g., the person is always the driver), or the like. As more data is collected, logic 450 may more easily detect and understand voice data from that particular person (e.g., similar to conventional speech recognition applications), or media use preferences (e.g., user may send voice commands to GPS or mobile phone more frequently than accessing media playback applications). These repeated identification and routing processes can help logic 450 more quickly, reliably, and efficiently perform the novel concepts discussed herein (e.g., see FIGS. 4-8).

In some embodiments, assigning a priority to audio sources can resolve a problem where two audio sources are providing competing instructions (e.g., GPS commands) to control or affect a same resource (e.g., GPS 422). Thus, a priority can be associated with each audio source, such that audio data from a higher priority audio source may be given precedence over audio data from a lower priority audio source. For example, an audio source determined to be coming from the driver's seat may be given a higher priority than an audio source determined to be coming from a rear passenger seat. Priority can be automatically assigned based on location (e.g., which passenger seat the audio signal is coming from), may be programmable (e.g., by a user), and/or may be associated with a user profile. User profile database 470 can be implemented in software, firmware, hardware, or a combination thereof. Database 470 can store user profiles, vehicle/infotainment settings associated with the user profiles, and the like.

In some embodiments, logic 450 can analyze voice data based on audio characteristics (e.g., amplitude, frequency, and/or phase content) and associated it with a user profile (i.e., stored on user profile database 470). User preferences, vehicle settings, priority settings, etc., can be stored and associated with a user profile. At a later time when new voice data is determined to be from the same person (e.g., based on the audio characteristics), user preferences, vehicle settings, and priority settings can be automatically applied. For example, a user sitting in the driver's seat may alter seat adjustment settings, temperature settings, audio settings (e.g., stereo volume, radio station preferences, etc.), and driving settings (e.g., suspension settings), among other controllable vehicle features. Those settings can be associated with the user profile such that when that user is identified by logic 450 at a later time (by the audio characteristics of the user's voice data), and the user is located in the driver's seat, those settings can automatically apply. In another example, if the same user is sitting in a rear passenger seat, but is assigned a higher priority than the driver, then certain settings associated with the higher-priority user profile may automatically apply (e.g., stereo settings, temperature settings, etc.) when that user is determined to be in the vehicle by the audio location and user identification techniques discussed above.

Figure 5:
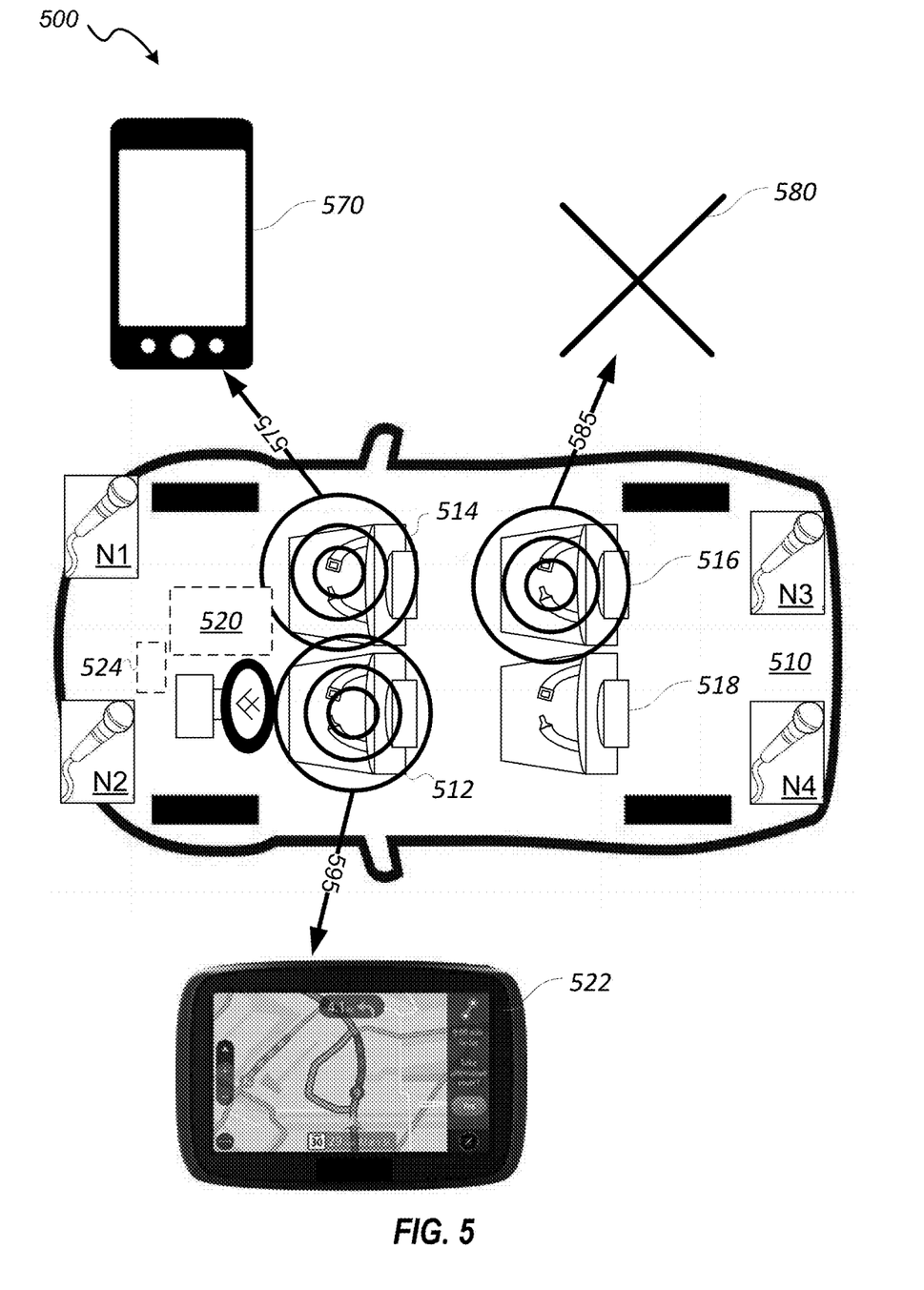
FIG. 5 shows a simplified block diagram of a system for automatically locating, isolating, and routing voice data, according to certain embodiments.

FIG. 5 shows a simplified block diagram of a system 500 for automatically locating and isolating an audio source in a vehicle, according to certain embodiments. Vehicle 510 is shown with similar features as vehicle 410 of FIG. 4 (e.g., user interface 520, passenger seats 512-518, microphones N1-N4, logic and processors (not shown), etc.). Vehicle 510 includes three audio sources located on passenger seat 512, 514, and 516. A first audio source can be the driver giving GPS commands for a GPS device 522. A second audio source can be a front seat passenger talking on a cell phone 570. A third audio source can be a back seat passenger speaking out loud.

In some embodiments, logic 450 (as described above with respect to FIG. 4) can determine a location of an audio source, isolate that audio source (e.g., by filtering out audio signals from other sources), and route that audio source to a desired destination. Referring to FIG. 5, logic 450 can identify a first audio source coming from passenger seat 512 (driver's seat). The first audio source can be isolated by filtering out audio from other audio sources, controlling the directional focus of the array of microphones (N1-N4) to passenger seat 512, removing common-mode signals from the audio, removing audio coming from outside of vehicle 510, or any combination thereof. Once the first audio source is isolated, logic 450 can determine the intended destination through voice recognition (e.g., recognizing a voice command that identifies the intended destination), user input (receiving user instructions via user interface 520), or the like. In FIG. 5, the driver (e.g., first audio source) is giving a GPS command. Logic 450 detects and interprets the GPS command and routes voice data received from the first audio source to GPS 522. Similarly, the second audio source coming from passenger seat 514 can be isolated, identified (recognize voice commands), and routed to cell phone 570. As discussed above, the third audio source may be conversation that is not intended for any aspect of infotainment or vehicle control. Logic 450 can isolate, identify, and filter the audio from audio signals coming from the first and second audio sources. One of ordinary skill in the art would understand the many variations, modifications, possible scenarios, and alternatives to the non-limiting examples described above.

Figure 6:
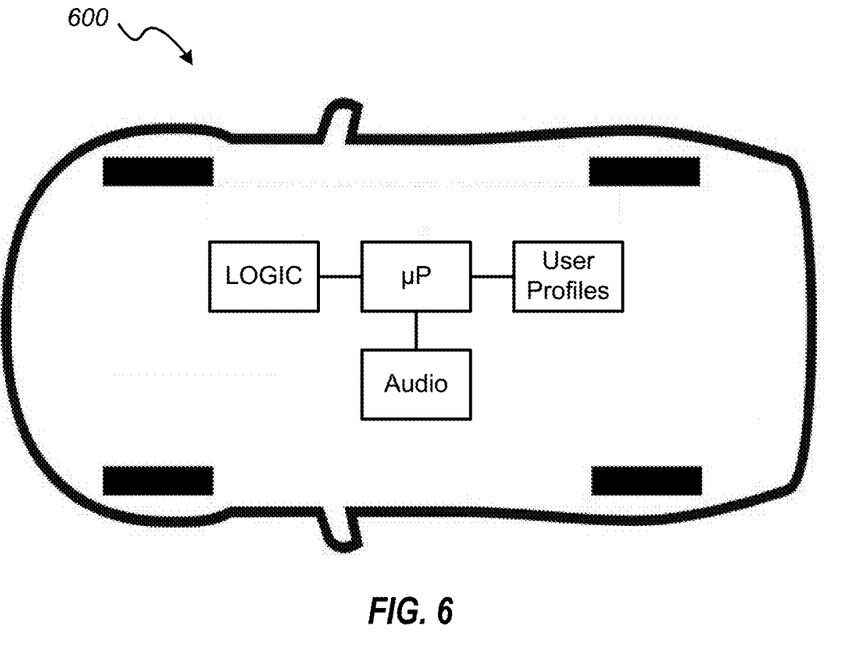
FIG. 6 shows a simplified block diagram of a system including a vehicle and a fully contained system for automatic audio-source location detection and isolation in a vehicle, according to certain embodiments.

FIG. 6 shows a simplified block diagram of a system 600 including a vehicle and a fully-contained system for automatic audio-source location detection and isolation in a vehicle, according to certain embodiments. System 600 can be all-inclusive such that all logic processing (audio analysis, location detection) and database comparison is performed by components on the vehicle. In some embodiments, communication capabilities (e.g., via cellular, Wi-Fi, ZigBee, Bluetooth, RF, etc.) can be used to connect system 600 to the cloud or to other vehicles for crowd sharing/sourcing database data (e.g., sharing user profiles between vehicles).

Figure 7:
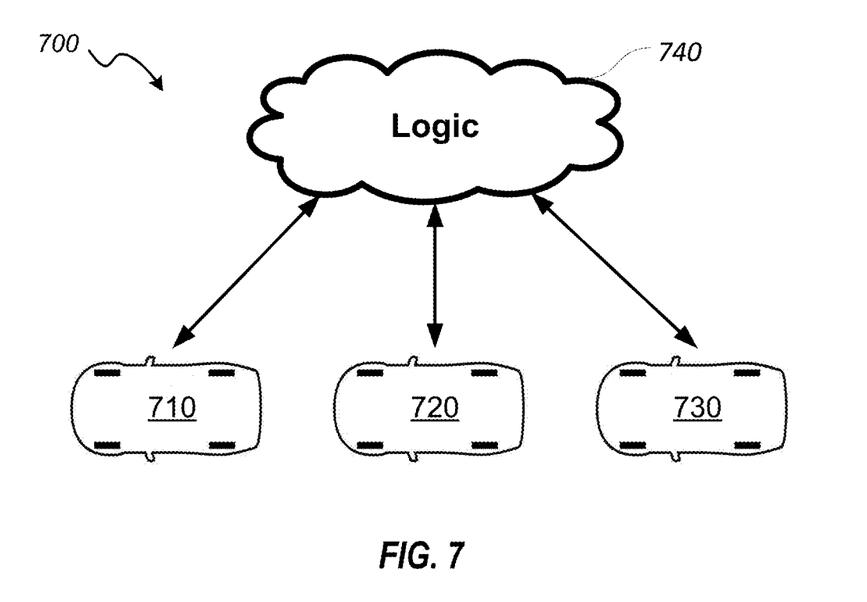
FIG. 7 shows simplified block diagram of a system including a number of vehicles communicatively coupled to the cloud for automatic audio location detection and isolation in a vehicle, according to certain embodiments.

FIG. 7 shows simplified block diagram of a system 700 including a number of vehicles communicatively coupled to the cloud for automatic location detection and isolation of audio in a vehicle, according to certain embodiments. In system 700, each vehicle 710-730 can offload resources configured for automatic location detection, filtering, and audio enhancement in a vehicle to off-site resources in cloud 740. In some embodiments, cloud 740 may contain logic (as described above), a database, and one or more processors to execute some or all aspects of the analysis discussed above. For example, vehicle 710 may receive audio data from a local array of microphones and transfer the audio data to the cloud to determine a location of the audio source (of the audio data) using phase analysis (as discussed above with respect to FIGS. 2-3). The cloud can be any suitable size of networked computing devices that may be configured to share computational resources. The many variations and alternatives of sharing resources between individual vehicles (e.g., vehicles 710-730) and cloud 740 would be understood by one of ordinary skill in the art.

Figure 8:
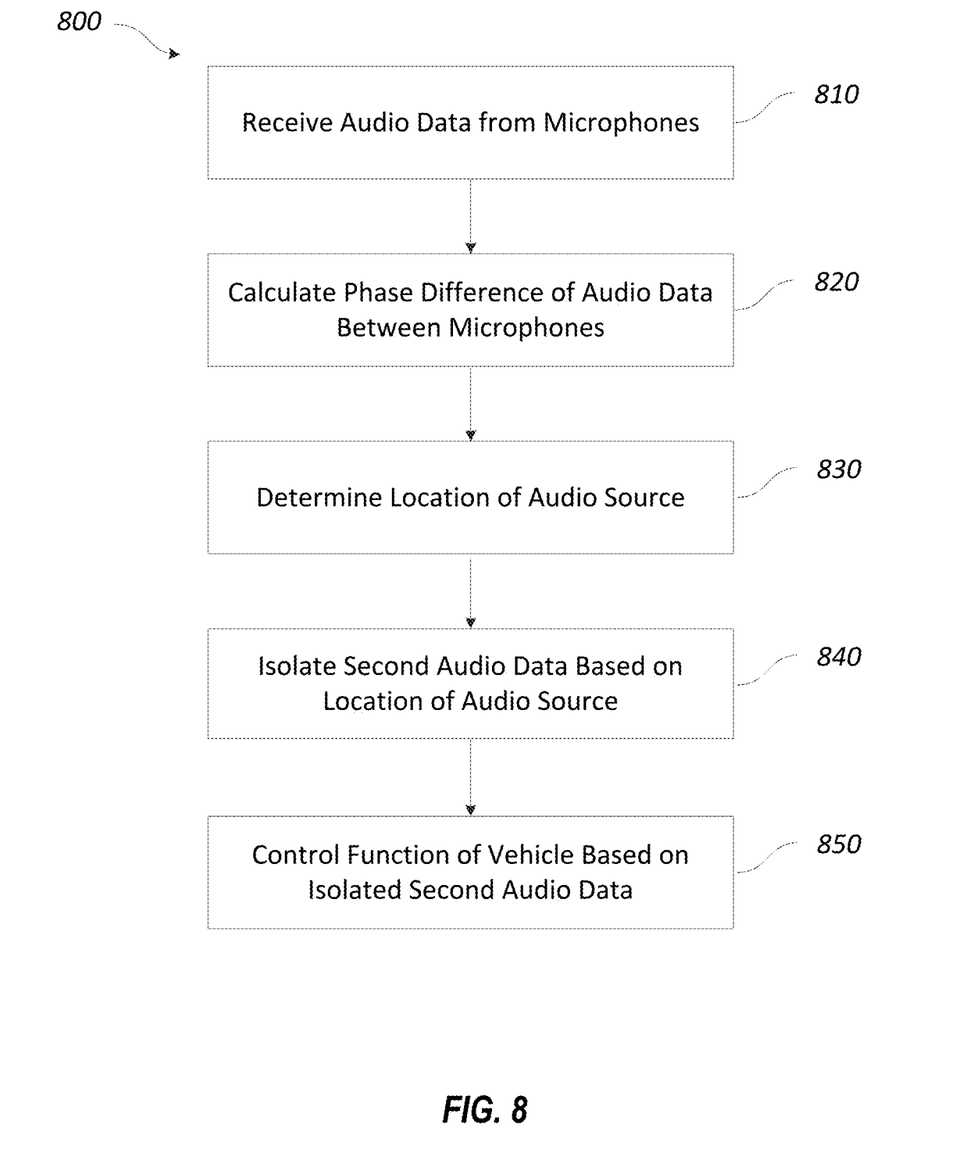
FIG. 8 shows a simplified flow chart for automatic audio-source location detection and isolation in a vehicle, according to certain embodiments.

FIG. 8 shows a simplified flow chart 800 for automatic audio-source location detection and isolation in a vehicle, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by processor 460 and logic block 450 of FIG. 4, or other computing device.

At step 810, method 800 can include receiving audio data detected by a plurality of microphones (e.g., N1-N4) placed in a cabin of a vehicle (e.g., vehicle 410). The audio data may correspond to any sounds inside the cabin including human voices, media devices, ambient noises, or the like.

At step 820, method 800 can include calculating a phase difference between the first audio data received from different ones of the plurality of microphones. The phase difference can be calculated using conventional trilateration techniques including time difference of arrival (TDOA), cross-correlation functions between audio signals, and geometric principles, as would be understood by one of ordinary skill in the art.

At step 830, method 800 can include determining a location of a source of the first audio data based on the calculated phase differences.

At step 840, method 800 can include isolating second audio data received from the plurality of microphones, taking into account the determined location of the source. The second audio data can be isolated in a number of ways. For instance, the plurality of microphones can be physically adjusted to move their directional focus to the location of the source of the first audio data. Adjusting the focus can improve the fidelity of the targeted second audio data (e.g., improving S/N and S/I) while effectively deemphasizing audio data from other locations. In some embodiments, isolating the second audio data can include amplifying the individual microphones in a particular manner to emphasize audio originating from the location of the source of the first audio (e.g., also known as audio beamforming). In further embodiments, isolating the second audio data can include post-processing steps (i.e., non-real-time analysis) that may incorporate any suitable algorithm or application that can parse audio data in the manner described above (e.g., isolating audio data based on a location of the audio source).

At step 860, method 800 can include controlling a function of the vehicle based on the isolated second audio data. In some embodiments, functions of the vehicle may include controlling a GPS, a media system, an infotainment suite of devices, a seat setting, a climate controller, a mirror setting, and the like. Those of ordinary skill in the art would appreciate the many variations and alternatives.

It should be appreciated that the specific steps illustrated in FIG. 8 provides a particular method 800 of automatic audio-source location detection, filtering, and audio enhancement in a vehicle, according to certain embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. For example, method 800 can include determining which of the plurality of passenger seats in the vehicle corresponds to the calculated location of the source of the voice data. In another example, method 800 can include associating a priority to the voice data based on the determined corresponding passenger seat. For example, voice data coming from the driver passenger seat may be assigned a higher priority than voice data coming from a rear passenger seat, as further described above with respect to FIGS. 4-5. In further embodiments, method 800 can include detecting voice data in the second audio data based on audio characteristics (e.g., amplitude, frequency, and/or phase content) of the second audio data, and determining a voice command in the voice data, where controlling the function of the vehicle is further based on the voice command in the voice data. For instance, logic 450 may recognize a voice command using conventional voice recognition techniques, as discussed above. In certain embodiments, only voice data received from the determined location is used to control the function of the vehicle, such that audio sources (and their corresponding voice commands) emanating from other locations in the cabin of the vehicle are ignored (e.g., filtered out) and do not affect the controlled function. One of ordinary skill in the art would recognize and appreciate many variations, modifications, and alternatives of method 800.

Figure 9:
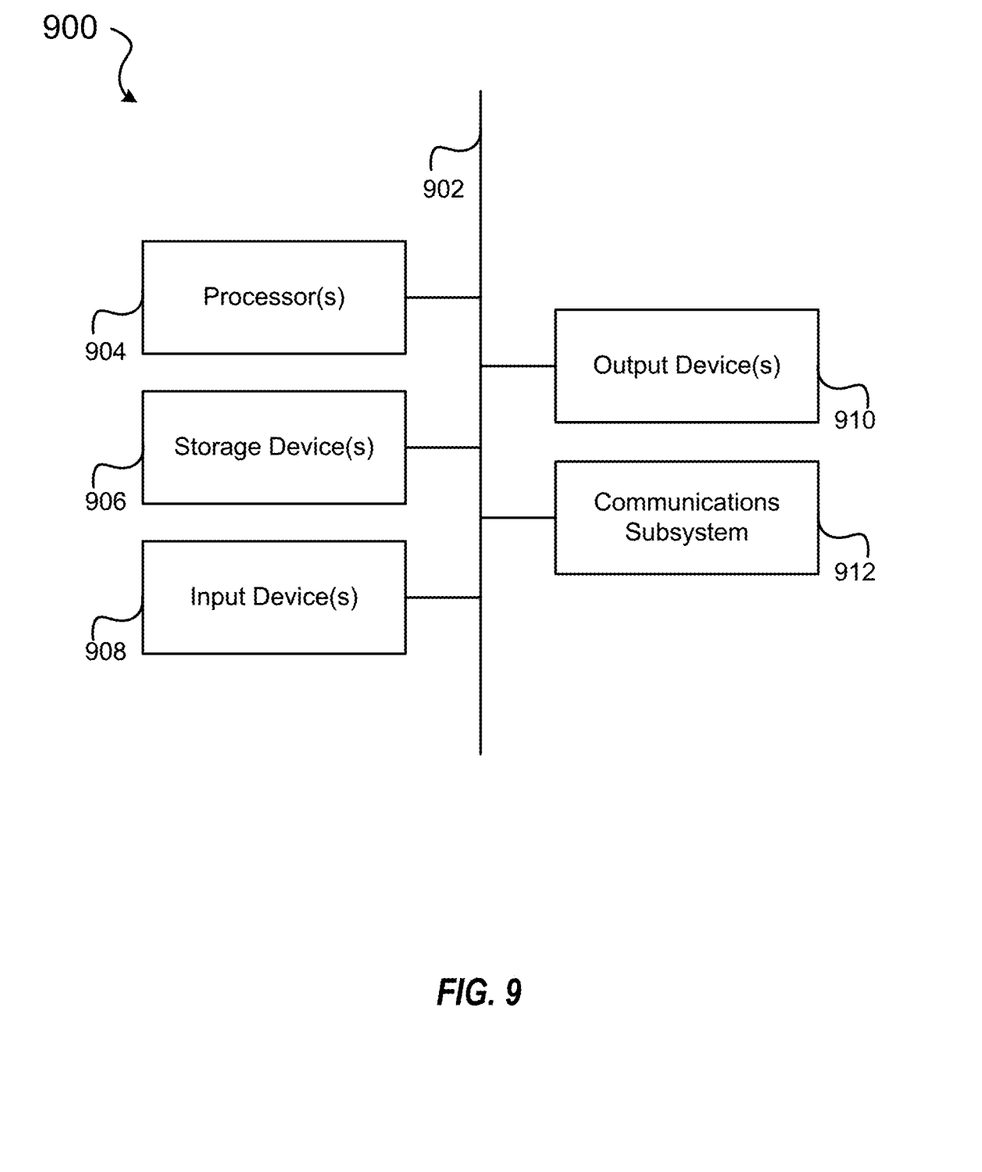
FIG. 9 is a simplified block diagram of computer system for automatic audio-source location detection and isolation in a vehicle, according to certain embodiments.

FIG. 9 is a simplified block diagram of computer system 900 for automatic audio-source location detection and isolation in a vehicle, according to certain embodiments. Computer system 900 can be used to implement any of the computer systems/devices (e.g., logic 450, database 460, processor(s) 440) described with respect to FIGS. 4-8. As shown in FIG. 9, computer system 900 can include one or more processors 904 to communicate with a number of peripheral devices via a bus subsystem 902. These peripheral devices can include storage devices 906, user input devices 908 (e.g. microphones N1-N4), user output devices 910, and communications subsystems 912.

In some examples, internal bus subsystem 902 can provide a mechanism for letting the various components and subsystems of computer system 900 communicate with each other as intended. Although internal bus subsystem 902 is shown schematically as a single bus, alternative embodiments of the bus subsystem can utilize multiple buses. Additionally, communications subsystem 912 can serve as an interface for communicating data between computer system 900 and other computer systems or networks (e.g., in the cloud). Embodiments of communications subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 908 can include a microphone, keyboard, pointing devices (e.g., mouse, trackball, touchpad, etc.), a barcode scanner, a touch-screen incorporated into a display, audio input devices (e.g., voice recognition systems, etc.), Human Machine Interfaces (HMI) and other types of input devices. In general, use of the term "input device" is intended to include all possible types of devices and mechanisms for inputting information into computer system 900. Additionally, user interface output devices 910 can include a display subsystem or non-visual displays such as audio output devices, etc. The display subsystem can be any known type of display device. In general, use of the term "output device" is intended to include all possible types of devices and mechanisms for outputting information from computer system 900.

Storage devices 906 can include memory subsystems and file/disk storage subsystems (not shown), which can be non-transitory computer-readable storage media that can store program code and/or data that provide the functionality of embodiments of the present disclosure (e.g., method 900). In some embodiments, storage devices 906 can include a number of memories including main random access memory (RAM) for storage of instructions and data during program execution and read-only memory (ROM) in which fixed instructions may be stored. Storage devices 906 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

Computer system 900 might also include a communications subsystem 912, which can include without limitation, a modem, a network card (wireless or wired), an infrared communication device, a wireless communication device and/or chipset (such as a Bluetooth device, an 802.11 device, a WiFi device, a WiMax device, cellular communication facilities, etc.), and/or the like. Communications subsystem 912 may permit data to be exchanged with a network, other computer systems, and/or any other devices described herein. In many implementations, computer system 900 can further comprise a non-transitory working memory, which can include a RAM or ROM device, as described above.

It should be appreciated that computer system 900 is illustrative and not intended to limit embodiments of the present disclosure. Many other configurations having more or fewer components than system 900 are possible.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A computer-implemented method, comprising:
   receiving, by a processor, first audio data from a plurality of microphones disposed in a cabin of a vehicle;
   calculating, by the processor, phase differences between the first audio data received from different ones of the plurality of microphones;
   determining, by the processor, that a location of a source of the first audio data is located in a driver's seat based on the calculated phase differences;
   isolating, by the processor, second audio data received from the plurality of microphones, taking into account the determined location of the source;
   detecting, by the processor, voice data in the second audio data based on audio characteristics of the second audio data;
   determining, by the processor, a voice command in the voice data;
   generating a user profile associated with the voice data;
   detecting changes to driver-controlled performance characteristics of the vehicle;
   associating the detected changes with the user profile;
   detecting subsequent audio data having audio characteristics corresponding to the voice data;
   determining that a location of a source of the subsequent audio data is located in the driver's seat; and
   applying the detected changes to the driver-controlled performance characteristics of the vehicle;
   controlling a function of the vehicle based on the voice command in the voice data in the second audio data.

2. The method of claim 1 further comprising:
   determining, by the processor, a location of a second source of third audio data received from the different ones of the plurality of microphones;
   isolating, by the processor, fourth audio data received from the plurality of microphones, taking into account the determined location of the second source; and
   controlling a second function of the vehicle based on the isolated fourth audio data.

3. The method of claim 1 wherein the vehicle includes a plurality of passenger seats, and wherein the method further comprises:
   determining, by the processor, which of the plurality of passenger seats corresponds to the determined location of the source of the first audio data; and
   associating a priority to the second audio data based on the determined corresponding passenger seat.

4. The method of claim 3 wherein when the determined corresponding passenger seat is a driver's seat, the associated priority of the second audio data is assigned a highest priority, and wherein when the determined corresponding passenger seat is not the driver's seat the associated priority of the second audio data is assigned a lower priority.

5. The method of claim 1 wherein isolating the second audio data includes adjusting a directional focus of the plurality of microphones toward the determined location of the source of the first audio data.

6. A system comprising:
   one or more processors; and one or more non-transitory computer-readable storage mediums containing instructions configured to cause the one or more processors to perform operations including:
   receiving, by a processor, first audio data from a plurality of microphones disposed in a cabin of a vehicle;
   calculating, by the processor, phase differences between the first audio data received from different ones of the plurality of microphones;
   determining, by the processor, that a location of a source of the first audio data is located in a driver's seat based on the calculated phase differences;
   isolating, by the processor, second audio data received from the plurality of microphones, taking into account the determined location of the source;
   controlling a function of the vehicle based on the isolated second audio data;
   detecting, by the processor, voice data in the second audio data based on audio characteristics of the second audio data;
   determining, by the processor, a voice command in the voice data,
   wherein the controlling the function of the vehicle is based on the voice command in the voice data in the second audio data,
   generating a user profile associated with the voice data;

detecting changes to driver-controlled performance characteristics of the vehicle;
associating the detected changes with the user profile;
detecting subsequent audio data having audio characteristics corresponding to the voice data;
determining that a location of a source of the subsequent audio data is located in the driver's seat; and
applying the detected changes to the driver-controlled performance characteristics of the vehicle.

7. The system of claim 6 further comprising instructions configured to cause the one or more processors to perform operations including:
determining, by the processor, a location of a second source of third audio data received from the different ones of the plurality of microphones;
isolating, by the processor, fourth audio data received from the plurality of microphones, taking into account the determined location of the second source; and
controlling a second function of the vehicle based on the isolated fourth audio data.

8. The system of claim 6 wherein the vehicle includes a plurality of passenger seats, and wherein the system further comprises instructions configured to cause the one or more processors to perform operations including:
determining, by the processor, which of the plurality of passenger seats corresponds to the determined location of the source of the first audio data; and
associating a priority to the second audio data based on the determined corresponding passenger seat.

9. The system of claim 8 wherein when the determined corresponding passenger seat is a driver's seat, the associated priority of the second audio data is assigned a highest priority, and wherein when the determined corresponding passenger seat is not the driver's seat the associated priority of the second audio data is assigned a lower priority.

10. The system of claim 6 wherein isolating the second audio data includes adjusting a directional focus of the plurality of microphones toward the determined location of the source of the first audio data.

11. A system comprising:
means for receiving first audio data from a plurality of microphones disposed in a cabin of a vehicle;
means for calculating phase differences between the first audio data received from different ones of the plurality of microphones;
means for determining that a location of a source of the first audio data is located in a driver's seat based on the calculated phase differences;
means for isolating second audio data received from the plurality of microphones, taking into account the determined location of the source;
means for detecting voice data in the second audio data based on audio characteristics of the second audio data;
means for determining a voice command in the voice data,
means for generating a user profile associated with the voice data;
means for detecting changes to driver-controlled performance characteristics of the vehicle;
means for associating the detected changes with the user profile;
means for detecting subsequent audio data having audio characteristics corresponding to the voice data;
means for determining that a location of a source of the subsequent audio data is located in the driver's seat;
means for applying the detected changes to the driver-controlled performance characteristics of the vehicle; and
means for controlling a function of the vehicle is based on the voice command in the voice data in the second audio data.

12. The system of claim 11 further comprising:
means for determining a location of a second source of third audio data received from the different ones of the plurality of microphones;
means for isolating fourth audio data received from the plurality of microphones, taking into account the determined location of the second source; and
means for controlling a second function of the vehicle based on the isolated fourth audio data.

13. The system of claim 11 wherein the vehicle includes a plurality of passenger seats, and wherein the system further comprises:
means for determining which of the plurality of passenger seats corresponds to the determined location of the source of the first audio data; and
means for associating a priority to the second audio data based on the determined corresponding passenger seat.

14. The system of claim 13 wherein when the determined corresponding passenger seat is a driver's seat, the associated priority of the second audio data is assigned a highest priority, and wherein when the determined corresponding passenger seat is not the driver's seat the associated priority of the second audio data is assigned a lower priority.

* * * * *